United States Patent [19]

Sharp

[11] 3,963,189

[45] June 15, 1976

[54] MINIATURE TAPE CARTRIDGE AND ADAPTOR

[76] Inventor: Andrew Peter Sharp, 5 Dufresne Court, Penthouse No. 4, Don Mills, Ontario, Canada

[22] Filed: June 4, 1974

[21] Appl. No.: 476,329

[52] U.S. Cl............................ 242/55.19 A; 360/93
[51] Int. Cl......................................... G11B 23/10
[58] Field of Search............. 242/55.19 H, 55.19 R, 242/197, 198, 199, 200; 360/93

[56] References Cited
UNITED STATES PATENTS

| | | | |
|---|---|---|---|
| 3,287,508 | 11/1966 | Morrison | 242/55.19 A X |
| 3,482,792 | 12/1969 | Auld | 242/55.19 A |
| 3,495,787 | 2/1970 | Wallace | 242/199 |
| 3,531,127 | 9/1970 | Harper | 242/55.19 A |
| 3,661,336 | 5/1972 | Lace | 242/55.19 A |
| 3,697,014 | 10/1972 | Lowry et al. | 242/197 X |
| 3,777,070 | 12/1973 | Bumb, Jr. | 242/55.19 A |

*Primary Examiner*—Billy S. Taylor

[57] ABSTRACT

A miniature tape cartridge comprising a housing for carrying an endless recording tape therein. The housing has a front end with at least one opening for access to part of the recording tape entrained therein past the opening for engagement of the tape with an external drive source for displacing the tape at a predetermined speed and to permit an external detection means to contact and detect information signals recorded on the tape. Alignment means are also provided and associated with the front end of the cartridge for positioning the tape in a predetermined plane with respect to the external detection means. Also provided is a tape adaptor for receiving the cartridge therein and for positioning same in a continuous loop tape player whereby the tape can be engaged by a drive source and detection means.

7 Claims, 6 Drawing Figures

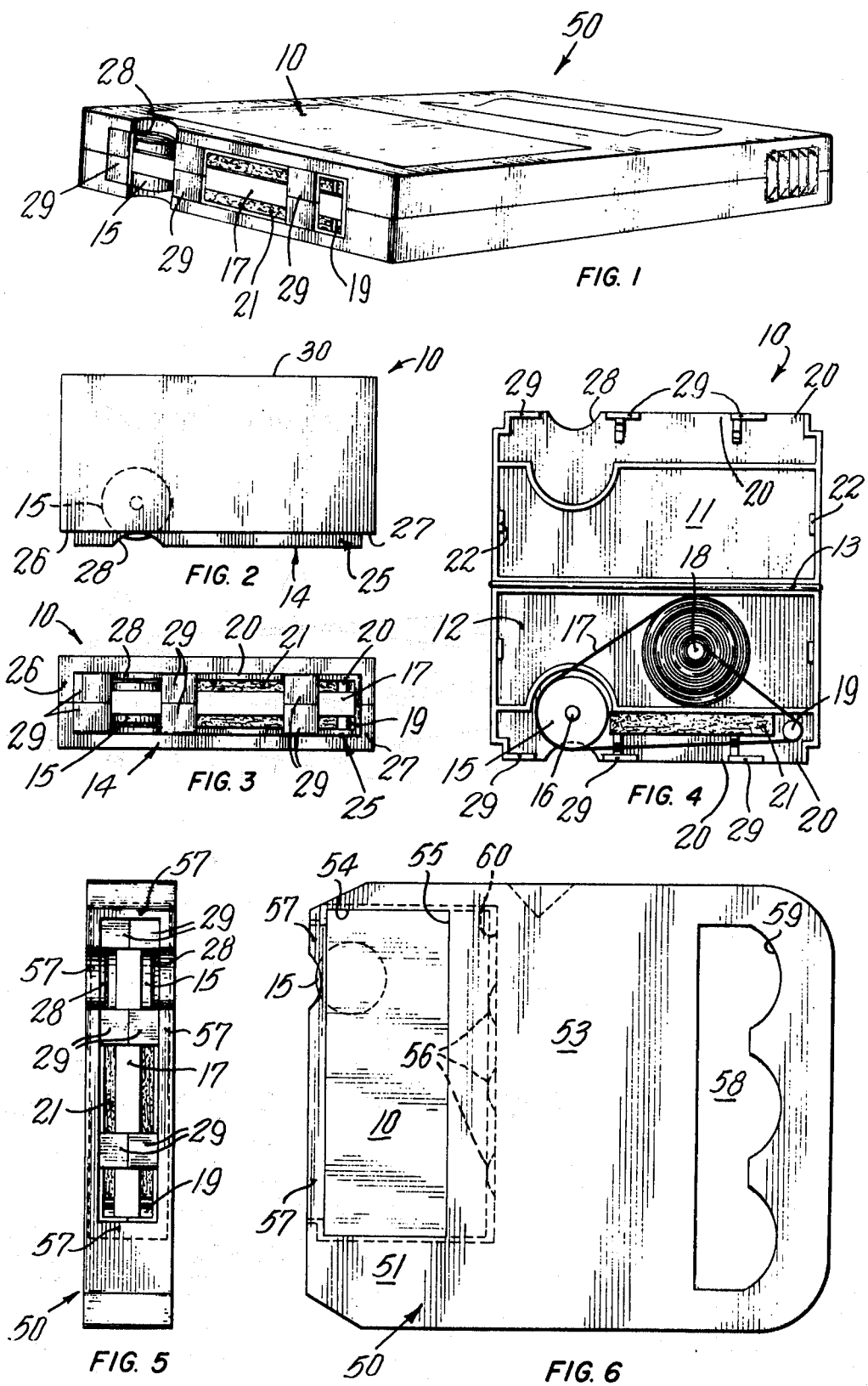

MINIATURE TAPE CARTRIDGE AND ADAPTOR

BACKGROUND OF INVENTION a. Field of the Invention

The present invention relates to a miniature tape cartridge which is removably securable in an adaptor for use in a continuous loop tape player.

b. Description of Prior Art

Cartridges of various types have heretofore been provided for storage of a recording tape and for adaptation into a cartridge-type tape player. The cartridge is provided with a front end configuration whereby when inserted into the tape player, it will automatically place the player in operation and cause the tape inside the cartridge to be driven into engagement with a detection means to detect the signals recorded on the tape.

One disadvantage of this type of cartridge is that these cartridges comprise long lengths of tape and therefore the cartridge is relatively large. Also, a large amount of space is required to store the cartridges when not in use. The information stored in such cartridges is normally equivalent to the information stored on a 33 r.p.m. type disc normally used with a record player apparatus. Because of the length of tape and the amount of information stored thereon and also because of the relatively large amount of plastic material utilized in making each of these cartridges, the said cartridge is proving to be somewhat costly.

SUMMARY OF THE INVENTION

It is a feature of the present invention to provide a cartridge which is very small, contains a shorter length of tape and which is economical to produce.

It is a further feature of the present invention to provide a short length tape having approximately from 2 to 6 minutes of playing time, depending on the number of tracks utilized for the storage of the signals.

A still further feature is to provide a cartridge which is adapted to be retained in a tape cartridge adaptor which is insertable in a continuous loop tape player whereby to cause the tape of the miniature cartridge to be driven and to be engaged with detection means for detecting and reproducing the signals stored on the tape.

According to the above features, from a broad aspect, the present invention provides a miniature tape cartridge comprising a housing for carrying an endless recording tape therein. The housing has a front end with at least one opening for access to part of the recording tape entrained therein past the opening for engagement of the tape with an external drive source for displacing the tape at a predetermined speed and to permit an external detection means to contact and detect information signals recorded on the tape. Alignment means is also associated with the front for positioning the tape in a predetermined plane with respect to the external detection means.

From a still further broad aspect, the present invention provides a tape cartridge adaptor for use with a miniature tape cartridge having a drivable endless recording tape entrained therein. The cartridge has a front end with an opening therein for exposing part of the tape. The adaptor has a body member having an adaptor end portion for receiving the cartridge. An extension portion is provided rearwardly of the adaptor end portion for positioning and retracting the adaptor end in a tape player. The adaptor end has a cartridge receiving cavity and an opening in a wall thereof adjacent a front wall of the adaptor to permit the cartridge to be inserted and retained in the cavity. Biasing means are also provided in the cavity for urging the cartridge front end in a locating opening in the adaptor front wall in response to the alignment means whereby the tape can be engaged by a drive source and detection means in the continuous loop tape player.

BRIEF DESCRIPTION OF THE PREFERRED EMBODIMENTS

A preferred embodiment of the present invention will now be described with reference to the accompanying drawings in which:

FIG. 1 is a perspective view of one type cartridge adaptor having a miniature cartridge positioned therein;

FIG. 2 is a plan view of the miniature cartridge;

FIG. 3 is a front end view of the miniature cartridge;

FIG. 4 is a plan view illustrating the two shell portions and the internal construction of the miniature cartridge;

FIG. 5 is a plan view of the cartridge adaptor, and

FIG. 6 is a front end view of the cartridge adaptor showing the location of the cartridge.

DESCRIPTION OF THE PREFERRED EMBODIMENTS

With particular reference to FIGS. 1 to 3, there is shown the miniature cartridge 10 of the present invention. The cartridge 10 is of substantially rectangular configuration and constructed of two hollow shell portions 11 and 12 which are hinged together on an edge 13 remote from the front end 14 for juxtaposition of the shell portions. The hinge 13 may be also conveniently positioned on an edge wall instead of the rear wall of the cartridge. An idler wheel 15 is secured on a post or pinion 16 which may be formed integral with one of the shell portions. An endless length of tape 17 is wound about a post or pinion 18, and entrained about the idler wheel 15 and about a further post or pinion 19. Guide means in the form of slots are provided in small partition walls, to guide a portion of the tape past at least one opening 20 in the front end 14 of the cartridge. Cushion means 21, herein a sponge rubber with a plastic covering is positioned behind the tape 17 adjacent the opening 20 whereby when the cartridge is positioned in a tape player (not shown), detection means of the player can be positioned on the tape and urging it against the cushion 21 whereby the tape is held flat on the detection means. Locking tabs 22 are provided in one or both inner edges of the shell portions 11 and 12 whereby to positively lock both shell portions together when brought in juxtaposition.

As shown in FIGS. 1 and 2 the front end 14 of the cartridge is provided with a projection portion 25 and having a recess 26 thereabout. The projection portion 25 is substantially concentric with the outer periphery of the cartridge, as shown in FIG. 2. The recess 26 constitutes alignment means and has a flat alignment wall 27 which lies substantially in a plane which is parallel to an axis extending widthwise in the plane of the tape. Although not shown the alignment means can be provided by other forms of recesses or projections. For example, there may be provided a recess adjacent the end edges only of the cartridge whereby the projection portion would extend across the entire width of the cartridge with the exception of the end edges. Further-more, there may be provided only one recess conveniently located whereby to provide the proper alignment of the cartridge in a holder which will be described later.

As hereinshown the cartridge shell portions are constructed entirely of plastic material, and other suitable materials may suit the purpose.

As shown in FIG. 1, a notch 28 is provided in the projection portion 25 to expose a small portion of the idler wheel 15. The purpose of the notch is to permit an external drive source, (not shown) in a tape player to be positioned for frictional engagement with the idler wheel whereby to displace the tape in the cartridge at a predetermined speed. Reinforcement ribs 29 are provided transversely of the opening 20 to provide a rigid front therein and to protect the tape.

The miniature cartridge as herein above described is preferable, but not exclusively for the storage of small lengths of recording tape for storage of information substantially equivalent in length to information stored on a 45 r.p.m. type recording disc. The tape is normally of the eight-track type and utilizes two of its tracks when having information stored in stereophonic and four tracks when having information stored in quadraphonic. Thus depending on the number of tracks used, it is possible to store on such tapes up to about four pieces of music, being equivalent to two 45 r.p.m. record discs. The tape also possesses a conventional metallic strip which is designed to trigger a track changing device usually provided in tape players. Because of the small size of these cartridges, these can be easily stored in approximately One-third the space of a normal eight-track cartridge as is presently known in the industry.

Referring now to FIGS. 4 and 5 there is shown the tape cartridge adaptor 50 of the present invention. The adaptor 50 is of substantially the same configuration as eight-track cartridges heretofore known and having a substantially rectangular configuration with a specially adapted front end with tapered corners.

The front end or adaptor end portion 51 is provided with a locating opening 52 in the front wall 47 thereof for exposing part of the tape stored in the cartridge. The adaptor body member 50 is also provided with an extension portion 53 rearwardly of the adaptor end portion 51, for positioning and retracting the adaptor end portion in a tape player (not shown). The adaptor end portion 51 is provided with a cartridge receiving cavity 54 and an opening is provided in the top or bottom wall or both walls and adjacent the front end face of the adaptor to permit the cartridge to be inserted and retained in the cavity 54. Biasing means 56, herein in the form of leaf springs, is provided on the rear wall of the cavity for urging the cartridge 10 with its front end 14 in the locating opening 52 in the adaptor front wall 47. The alignment means 26 of the cartridge also engages with the ribs 57 provided about the locating opening 52. The ribs 57 may have various configurations depending on the configuration of the recesses constituting the alignment means 26.

The extension portion 53 may have various configuration as its purpose is primarily to insert and retract the adaptor into a continuous tape player. As shown in FIG. 1 the adaptor is substantially of a shape resembling the eight-track cartridge. As shown in FIG. 4 a through hole 58 is provided in the extension portion 53 with the rear wall 59 of the through hole 58 having undulations therein constituting finger grip means.

Because only one tape cartridge adaptor 50 is required for adapting any one of a plurality of miniature cartridges in a continuous tape player, the adaptor may be constructed of material which is more rigid and which has a longer life than the plastic material conventionally used. However, the plastic material has been found to be quite adequate for the intended purpose of the adaptor. As can be seen, the cartridge alone is too small to be inserted in a tape player and is not provided with a front face which is adapted to engage and automatically trigger the tape player. Thus, the cartridge must be carried by a holder to provide for the tape to be engaged and adapted with the external drive source and with the external detection means of the standard type eight-track tape player.

In operation, a cartridge is placed in the cavity through the opening 55 with the rear wall 30 of the cartridge positioned in the direction of the rear wall 60 of the cavity 54. The cartridge is pressed against the action of the spring so that the projection portion 25 of the cartridge will lie behind the alignment ribs in the front end of the adaptor. With the projection portion 25 aligned with the locating opening 52, the cartridge is then caused to move forward by the action of the spring 56 urging it in that direction. The cartridge will be urged forwardly until the ribs abut the flat face 27 of the alignment recesses 26 provided about the projection portion 25. In this position the front face 14 of the cartridge lies in the same plane as the end face of the holder. Thus, the cartridge is rigidly held in the holder and prevented from horizontal movement by engagement of the projection portion in the locating opening 52 and the engagement of the rearward portion between portions of the top and bottom walls of the adaptor. As seen in FIG. 4, the cavity extends rearwardly between the top and bottom walls along a predetermined distance. This distance is calculated to permit proper insertion of the cartridge rear end and to provide a small portion of the top and bottom wall to overlie a small rear portion of the cartridge.

I claim:

1. A miniature tape cartridge comprising a substantially rectangular housing for carrying an endless recording tape therein, said housing having a front end with at least one opening for access to part of said recording tape entrained therein past said opening for engagement of said tape with an external drive source for displacing said tape at a predetermined speed and to permit an external detection means to contact and detect information signals recorded on said tape, a substantially rectangular projection portion projecting concentrically from the outer periphery of said front end of said cartridge to define a recess having a flat alignment wall about said projection portion constituting an alignment means, said alignment wall lying in a plane substantially parallel to an axis extending widthwide in the plane of said tape, said alignment means locating said cartridge in a predetermined position within an adaptor housing whereby said adaptor housing will position said tape in a predetermined plane with respect to said external detection means.

2. A tape cartridge as claimed in claim 1 wherein said cartridge is constructed of two hollow shell portions hinged together on an edge remote from said front end for juxtaposition of said shell portions, an idler wheel in one of said shells, said tape being entrained in said one shell and about a portion of said idler wheel, guide means secured in said shell portions for guiding said tape along a predetermined path, cushion means adjacent a portion of said opening and located behind said tape, and a notch transversely of said projection portion and in alignment with said idler wheel to accommodate said drive source for frictional engagement with said idler wheel to drive said tape in said cartridge.

3. A tape cartridge adaptor for use with a miniature tape cartridge having a drivable endless recording tape entrained therein, said cartridge having a front end with an opening therein for exposing part of said tape, a body member having an adaptor end portion for receiving said cartridge, an extension portion rearwardly of said adaptor end portion for positioning and retracting said adaptor end in a tape player, said adaptor end having a cartridge receiving cavity and an opening in a wall thereof adjacent a flat front wall of said adaptor to permit said cartridge to be inserted and retained in said cavity, a locating opening in said flat front wall for exposing said opening in said front end of said cartridge located in said cavity, and locating means associated with alignment means for locating said tape in a predetermined plane with respect to said body member and a drive source and detection means of said tape player, biasing means in said cavity for urging said cartridge front end in said locating opening in said adaptor front wall and in response to said alignment means provided on said cartridge whereby said adaptor will position said tape for engagement by said drive source and said detection means in said continuous loop tape player.

4. A tape cartridge adaptor as claimed in claim 3 wherein said biasing means is a spring located in said cavity opposite said opening in said end face of said body for urging said front end of said cartridge in said opening.

5. A tape cartridge adaptor as claimed in claim 3 wherein said body member is a substantially rectangular member, said extension portion having a through hole therein to provide a finger grip means for handling of said adaptor body.

6. A tape cartridge holder as claimed in claim 3 wherein said cartridge is provided with a front end having a projection portion, said opening being provided in said projection portion to expose said recording tape entrained past said opening, said alignment means being associated with said projection portion for positioning said projection portion in said opening in said front end of said adaptor for positioning said tape in a predetermined plane with respect to said external detection means.

7. A tape cartridge adaptor as claimed in claim 6 wherein said alignment means is a recess provided in at least a portion of said cartridge front end adjacent said projection portion, said locating means being alignment ribs in said adaptor front wall adjacent said locating opening and engageable in said recess of said cartridge for positioning said cartridge front end in said adaptor end portion.

* * * * *